United States Patent
Batur

(10) Patent No.: US 9,491,375 B2
(45) Date of Patent: Nov. 8, 2016

(54) METHOD, SYSTEM AND COMPUTER PROGRAM PRODUCT FOR REDUCING A DELAY FROM PANNING A CAMERA SYSTEM

(71) Applicant: Texas Instruments Incorporated, Dallas, TX (US)

(72) Inventor: Aziz Umit Batur, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 385 days.

(21) Appl. No.: 13/632,592

(22) Filed: Oct. 1, 2012

(65) Prior Publication Data

US 2013/0083202 A1 Apr. 4, 2013

Related U.S. Application Data

(60) Provisional application No. 61/540,568, filed on Sep. 29, 2011.

(51) Int. Cl.
*H04N 5/232* (2006.01)
*H04N 5/262* (2006.01)

(52) U.S. Cl.
CPC ........ *H04N 5/2628* (2013.01); *H04N 5/23248* (2013.01); *H04N 5/23274* (2013.01)

(58) Field of Classification Search
CPC ..................... H04N 5/23248; H04N 5/23274; H04N 5/2628
See application file for complete search history.

(56) References Cited

U.S. PATENT DOCUMENTS

| | | | |
|---|---|---|---|
| 6,628,711 B1* | 9/2003 | Mathew et al. | 375/240.12 |
| 7,605,845 B2 | 10/2009 | Batur | |
| 7,649,549 B2 | 1/2010 | Batur | |
| 7,982,775 B2 | 7/2011 | Batur | |
| 8,179,446 B2 | 5/2012 | Hong | |
| 2005/0157181 A1* | 7/2005 | Kawahara | H04N 5/23245 348/208.6 |
| 2010/0141761 A1* | 6/2010 | McCormack | H04N 5/23248 348/143 |

* cited by examiner

*Primary Examiner* — Thai Tran
*Assistant Examiner* — Christopher T Braniff
(74) *Attorney, Agent, or Firm* — Michael A. Davis, Jr.; Frank D. Cimino

(57) ABSTRACT

For reducing a delay from panning a camera system, an estimate is received of a physical movement of the camera system. In response to the estimate, a determination is made of whether the camera system is being panned. In response to determining that the camera system is not being panned, most effects of the physical movement are counteracted in a video sequence from the camera system. In response to determining that the camera system is being panned, most effects of the panning are preserved in the video sequence, while concurrently the video sequence is shifted toward a position that balances flexibility in counteracting effects of a subsequent physical movement of the camera system.

18 Claims, 4 Drawing Sheets

METHOD, SYSTEM AND COMPUTER PROGRAM PRODUCT FOR REDUCING A DELAY FROM PANNING A CAMERA SYSTEM

CROSS-REFERENCE TO RELATED APPLICATION

This application claims priority to U.S. Provisional Patent Application Ser. No. 61/540,568, filed Sep. 29, 2011, entitled A METHOD FOR ELIMINATING PANNING DELAY IN DIGITAL VIDEO STABILIZATION, naming Aziz Umit Batur as inventor, which is hereby fully incorporated herein by reference for all purposes.

BACKGROUND

The disclosures herein relate in general to video processing, and in particular to a method, system and computer program product for reducing a delay from panning a camera system.

Substantially in real-time, a camera system may perform a digital video stabilization ("VS") operation to counteract most effects of unintentional movement of the camera system (e.g., undesired jitter caused by instability of an operator's hands), so that an image from the camera system appears to be more stable. However, the VS operation may cause the camera system to delay: (a) starting a movement of the image after the operator begins panning (e.g., intentionally moving) the camera system; and (b) ending the movement of the image after the operator ceases panning the camera system. In that situation, the operator may perceive such delay.

SUMMARY

For reducing a delay from panning a camera system, an estimate is received of a physical movement of the camera system. In response to the estimate, a determination is made of whether the camera system is being panned. In response to determining that the camera system is not being panned, most effects of the physical movement are counteracted in a video sequence from the camera system. In response to determining that the camera system is being panned, most effects of the panning are preserved in the video sequence, while concurrently the video sequence is shifted toward a position that balances flexibility in counteracting effects of a subsequent physical movement of the camera system.

DETAILED DESCRIPTION

Figure 1:
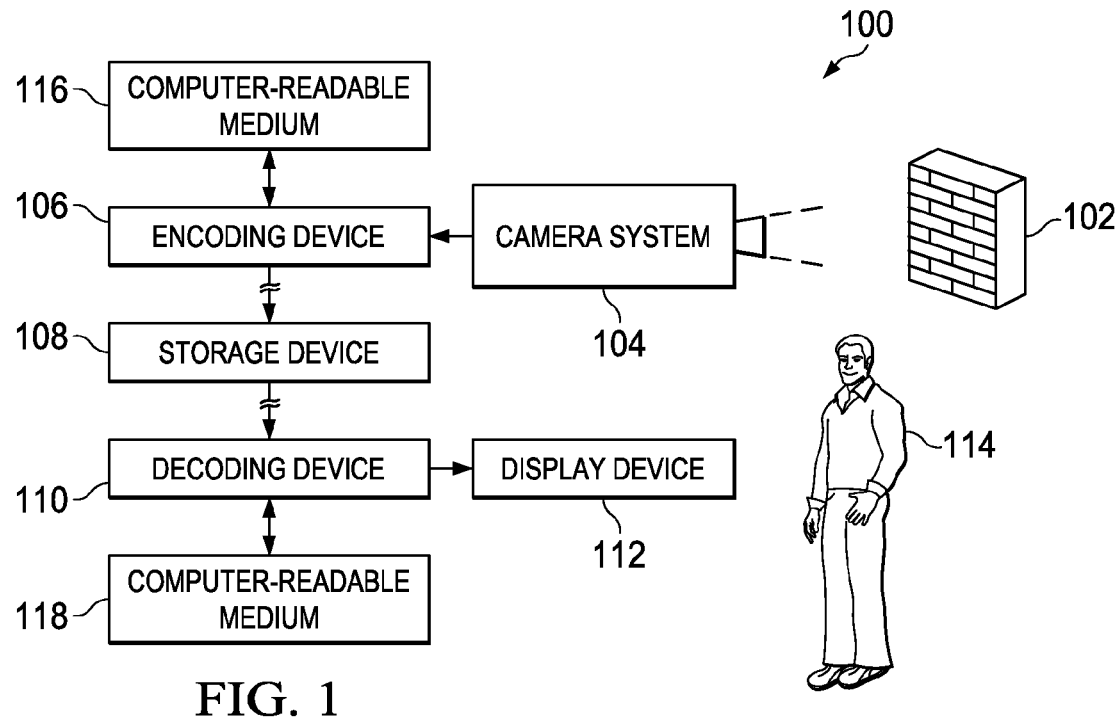
FIG. 1 is a block diagram of an information handling system of the illustrative embodiments.

FIG. 1 is a block diagram of an information handling system (e.g., one or more mobile smartphones), indicated generally at 100, of the illustrative embodiments. In the of FIG. 1, a scene (e.g., including a physical object 102 and its surrounding foreground and background) is viewed by a camera system 104, which: (a) digitizes images of such views; and (b) to an encoding device 106, outputs a video sequence that includes selected portions of such digitized (or "digital") images. The encoding device 106: (a) receives the video sequence from the camera system 104; (b) encodes the video sequence into a binary logic bit stream; and (c) outputs the bit stream to a storage device 108, which receives and stores the bit stream.

A decoding device 110: (a) reads the bit stream from the storage device 108; (b) in response thereto, decodes the bit stream into the video sequence; and (c) outputs the video sequence to a display device 112 for display to a human user 114. The display device 112: (a) receives the video sequence from the decoding device 110 (e.g., in response to a command that the user 114 specifies via a touchscreen of the display device 112); and (b) in response thereto, displays the video sequence, which is viewable by the user 114. The display device 112 is any suitable display device, such as a plasma display, a liquid crystal display ("LCD"), or a light emitting diode ("LED") display.

The encoding device 106 performs its operations in response to instructions of a computer-readable program that is stored on a computer-readable medium 116 (e.g., hard disk drive, flash memory card, or other nonvolatile storage device). Also, the computer-readable medium 116 stores a database of information for operations of the encoding device 106. Similarly, the decoding device 110 performs its operations in response to instructions of a computer-readable program that is stored on a computer-readable medium 118. Also, the computer-readable medium 118 stores a database of information for operations of the decoding device 110.

The system 100 is formed by electronic circuitry components for performing the system 100 operations, implemented in a suitable combination of software, firmware and hardware, such as one or more digital signal processors ("DSPs"), microprocessors, discrete logic devices, application specific integrated circuits ("ASICs"), and field-programmable gate arrays ("FPGAs"). In one embodiment: (a) a first mobile smartphone includes the camera system 104, the encoding device 106, and the computer-readable medium 116; and (b) a second mobile smartphone includes the decoding device 110, the display device 112 and the computer-readable medium 118.

In an alternative embodiment: (a) the encoding device 106 outputs the bit stream directly to the decoding device 110 via a network, such as a mobile (e.g., cellular) telephone network, a landline telephone network, and/or a computer network (e.g., Ethernet, Internet or intranet); and (b) accordingly, the decoding device 110 receives and processes the bit stream directly from the encoding device 106 substantially in real-time. In such alternative embodiment, the storage device 108 either: (a) concurrently receives (in parallel with the decoding device 110) and stores the bit stream from the encoding device 106; or (b) is absent from the system 100.

Figure 2:
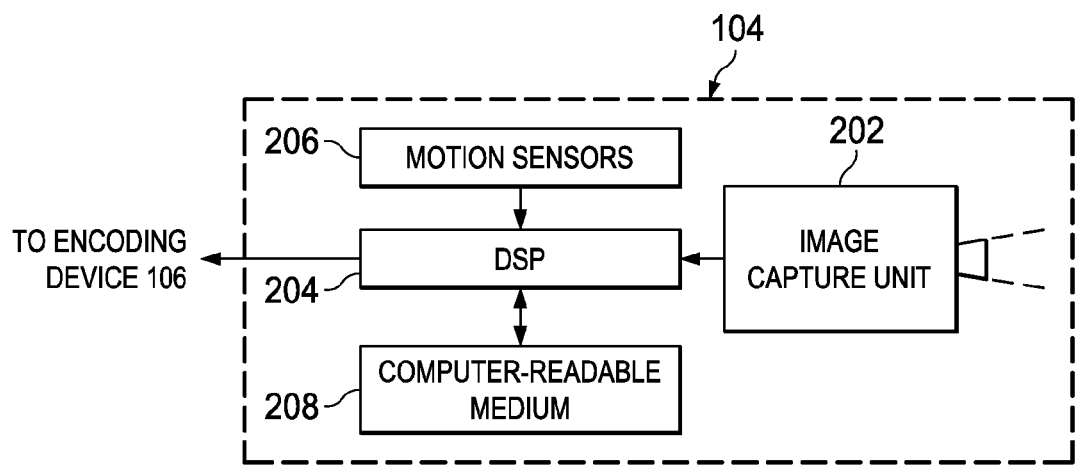
FIG. 2 is a block diagram of a camera system of FIG. 1.

FIG. 2 is a block diagram of the camera system 104, which includes yet another information handling system. The scene is viewed by an image capture unit 202, which: (a) digitizes images of such views; and (b) outputs such digitized (or "digital") images to a digital signal processor ("DSP") 204. Motion sensors 206: (a) determine a physical movement of the camera system 104; and (b) output an estimated motion vector that represents such physical movement. The motion sensors 206 determine such physical movement according to a suitable technique, such as gyroscopes, object tracking, active optics, electronic video stabilization (e.g., gyroscopes combined with digital motion compensation), and/or digital video stabilization (e.g., object tracking combined with digital motion compensation).

As discussed hereinabove, the camera system 104 includes various electronic circuitry components for performing its operations. For example, the DSP 204 is a computational resource for executing and otherwise processing instructions, and for performing additional operations (e.g., communicating information) in response thereto. Accordingly, the DSP 204 receives instructions of computer-readable software programs that are stored on a computer-readable medium 208 of the camera system 104. In response to those instructions, the DSP 204 executes such programs and performs its operations. For executing such programs, the DSP 204 processes data, which are stored in a memory of the DSP 204 and/or in the computer-readable medium 208.

Accordingly, in response to the estimated motion vector (from the motion sensors 206) and the instructions (from the computer-readable medium 208), the DSP 204: (a) automatically adjusts a window to select portions of the digital images from the image capture unit 202; and (b) to the encoding device 106, outputs the video sequence that includes those selected portions.

Figure 3:
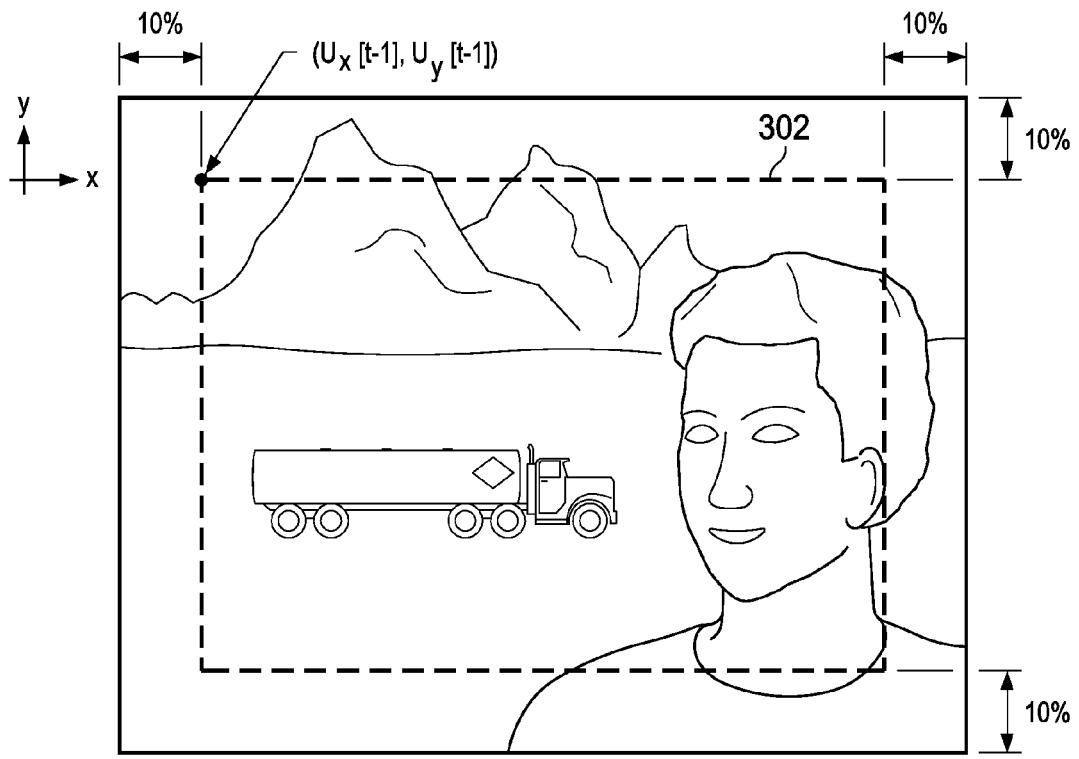
FIG. 3 is a diagram of a first image of an video sequence.
Figure 4:
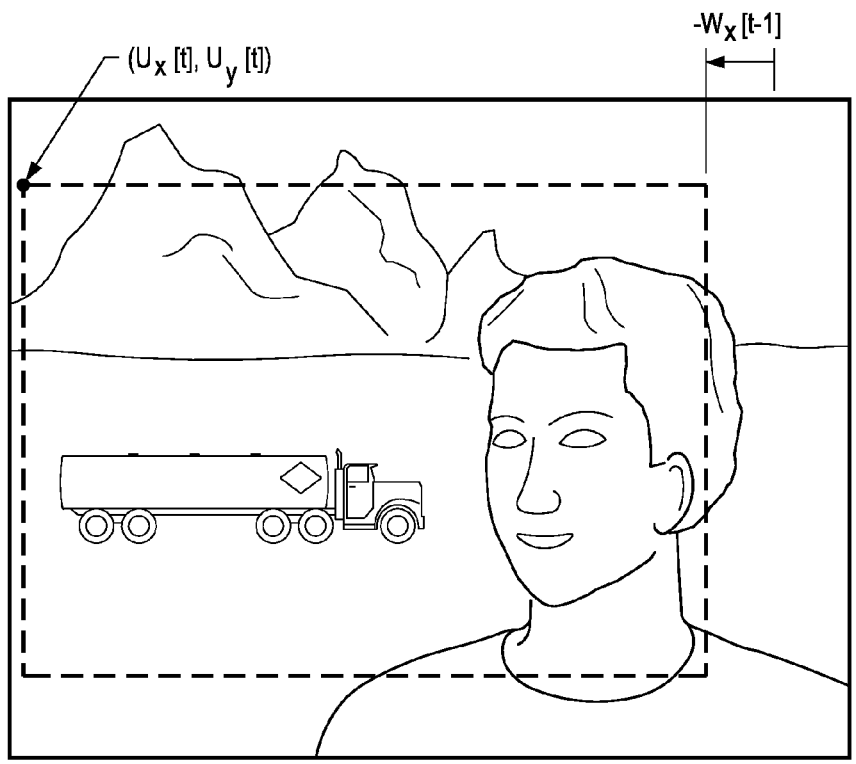
FIG. 4 is a diagram of a second image of the video sequence.
Figure 5:
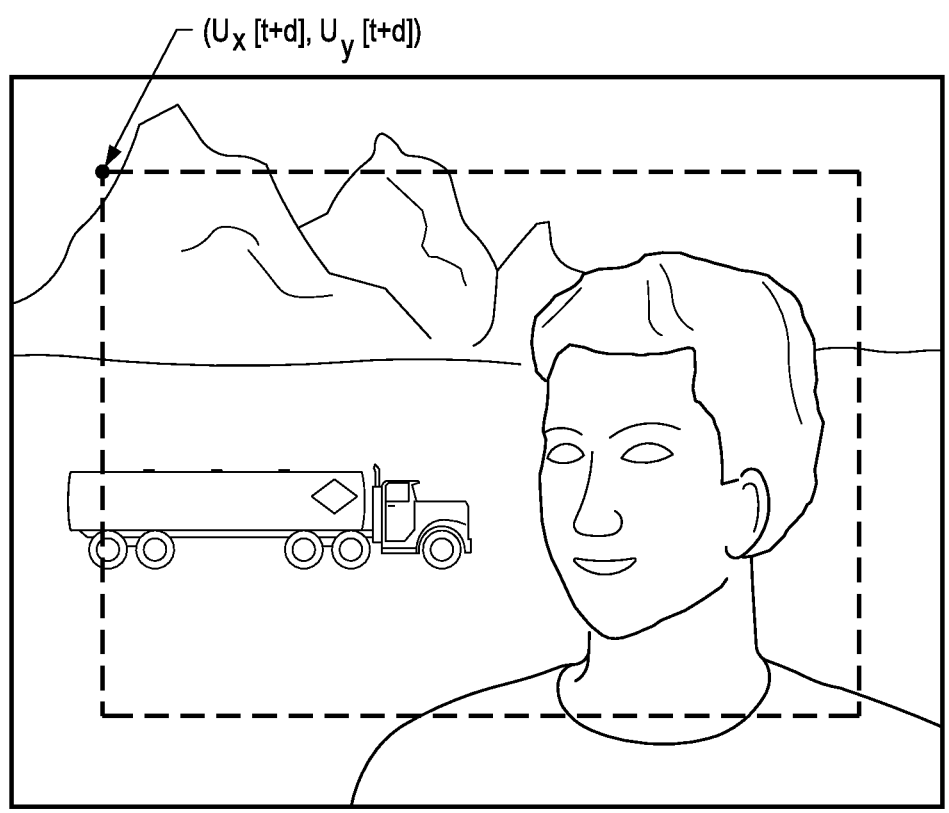
FIG. 5 is a diagram of a third image of the video sequence.

FIGS. 3, 4 and 5 are diagrams of images of an video sequence, received by the DSP 204 from the image capture unit 202 during: (a) a current frame t (FIG. 4); (b) an immediately preceding frame t−1 (FIG. 3); and (c) a subsequent frame t+d (FIG. 5), where (d−1) is a number of frames interposed between the current frame t and the subsequent frame t+d. In response to the estimated motion vector (from the motion sensors 206), the DSP 204: (a) automatically adjusts the window (indicated by dashed enclosure 302 of FIG. 3) to select a portion of the image; and (b) outputs the selected portion (which is enclosed by the window) to the encoding device 106. In the examples of FIGS. 3, 4 and 5: (a) along an x-axis, a length of the window is eighty percent (80%) of the image's length; (b) along a y-axis (which is perpendicular to the x-axis), a height of the window is eighty percent (80%) of the image's height; and (c) accordingly, an area of the window is sixty four percent (64%) of the image's area.

In the illustrative embodiments, during the current frame t: (a) $U_x[t]$ is an x-axis coordinate of an upper left corner of the window; and (b) $U_y[t]$ is a y-axis coordinate of the upper left corner of the window. Similarly, during the immediately preceding frame t−1: (a) $U_x[t−1]$ is the x-axis coordinate of the upper left corner of the window; and (b) $U_y[t−1]$ is the y-axis coordinate of the upper left corner of the window. As shown in the of FIG. 3, the window is initially centered within the image, so that the upper left corner of the window is located at its neutral position of $U_x[t−1]=0$ and $U_y[t−1]=0$, which balances flexibility in counteracting effects of a subsequent physical movement of the camera system 104. As the DSP 204 automatically shifts the upper left corner of the window, the DSP 204 likewise automatically shifts a remainder of the window, so that the DSP 204 preserves the window's size, aspect ratio, and orientation.

In the examples of FIGS. 3, 4 and 5, the camera system 104 is operated by a human ("operator"), such as the user 114. Substantially in real-time, the DSP 204 performs a digital video stabilization ("VS") operation to counteract most effects of unintentional movement of the camera system 104 (e.g., undesired jitter caused by instability of the operator's hands), while preserving most effects of intentional movement of the camera system 104 (e.g., panning caused by the operator). With a low pass filter, the DSP 204 performs the VS operation in a manner that helps to distinguish between high frequency (e.g., unintentional) and low frequency (e.g., intentional) movement of the camera system 104.

An estimated motion vector ($W_x[t−1]$, $W_y[t−1]$) represents the physical movement of the camera system 104 during the immediately preceding frame t−1 (FIG. 3), so that: (a) a positive $W_x[t−1]$ indicates a right movement of the camera system 104 along the x-axis, which causes a left shift of the image within the current frame t (FIG. 4); (b) a negative $W_x[t−1]$ indicates a left movement of the camera system 104 along the x-axis, which causes a right shift of the image within the current frame t; (c) a positive $W_y[t−1]$ indicates an upward movement of the camera system 104 along the y-axis, which causes a downward shift of the image within the current frame t; and (d) a negative $W_y[t−1]$ indicates an downward movement of the camera system 104 along the y-axis, which causes an upward shift of the image within the current frame t.

In the of FIGS. 3 and 4, during the immediately preceding frame t−1 (FIG. 3), the camera system 104 physically moves by a positive $W_x[t−1]$ along the x-axis, while remaining stationary along the y-axis, so that the motion sensors 206 output the estimated motion vector ($W_x[t−1]$, 0) to the DSP 204. In response thereto, during the current frame t (FIG. 4), the DSP 204 performs the VS operation to counteract most effects of such movement by: (a) shifting the window, so that the upper left corner of the window is located at $U_x[t]=−W_x[t−1]$ and $U_y[t]=0$; and (b) outputting the selected portion (which is enclosed by the window of FIG. 4) to the encoding device 106. In that manner, the selected portion (within the window of FIG. 4) is more closely aligned to the previously selected portion (within the window of FIG. 3), which the DSP 204 most recently output to the encoding device 106 during the immediately preceding frame t−1 (FIG. 3).

After the camera system 104 stops moving, the DSP 204 gradually returns the window to be centered within the image. In this example, the camera system 104 is stationary during the frame t (FIG. 4) and remains stationary until at least the frame t+d (FIG. 5), where d is a sufficient number of frames for returning the window to be centered within the image. Accordingly, in FIG. 5, the upper left corner of the window is located at its neutral position of $U_x[t+d]=0$ and $U_y[t+d]=0$, which balances flexibility in counteracting effects of a subsequent physical movement of the camera system 104.

Figure 6:
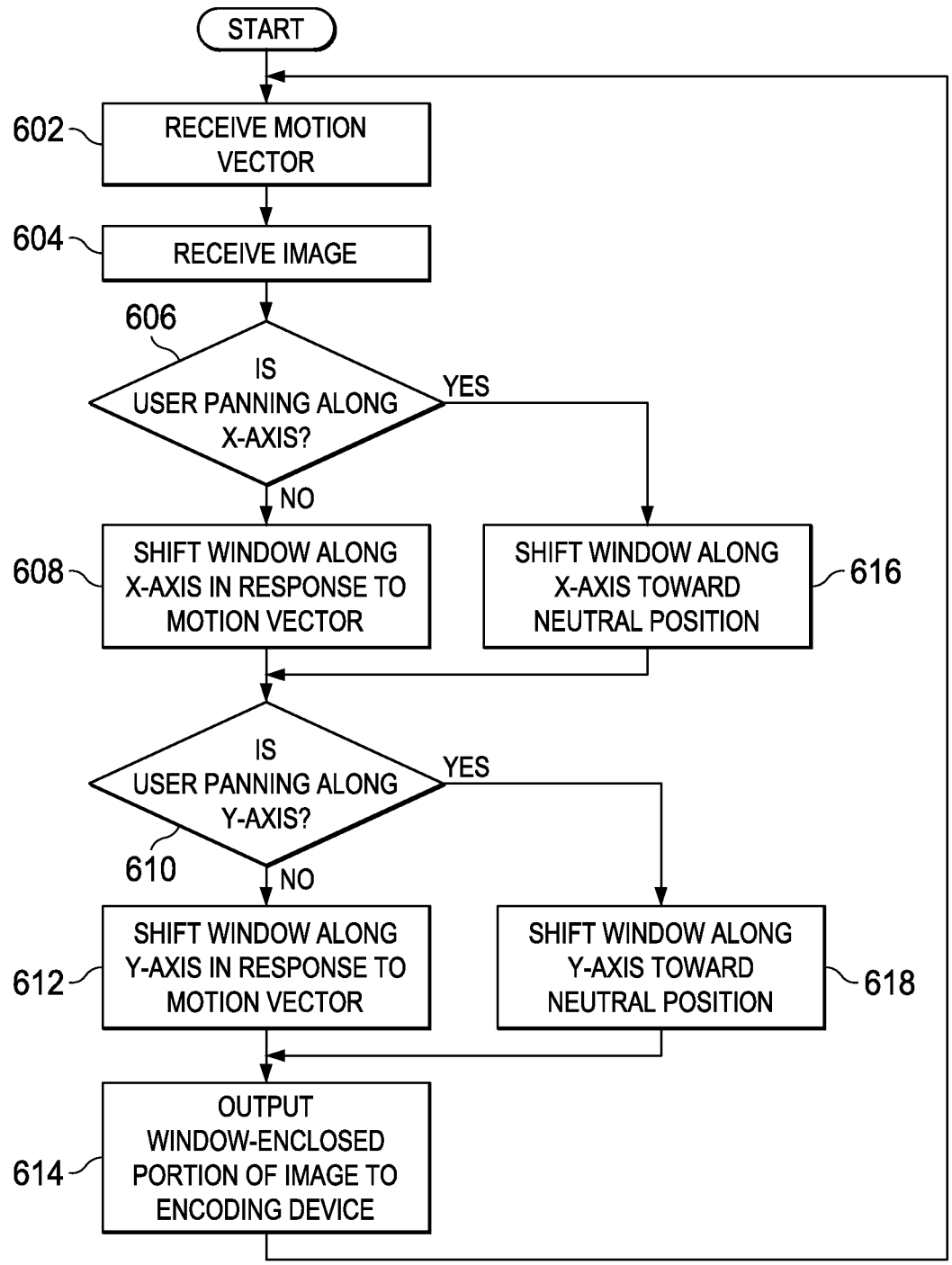
FIG. 6 is a flowchart of operation of the camera system.

FIG. 6 is a flowchart of operation of the camera system 104. At a step 602, the DSP 204 receives the estimated motion vector from the motion sensors 206. At a next step 604, the DSP 204 receives the image from the image capture unit 202 during a current frame t.

At a next step 606, the DSP 204 determines whether the camera system 104 is being panned (e.g., intentionally moving) along the x-axis. In the illustrative embodiments, the DSP 204 makes such determination by applying the following filter:

$$P_x[t]=\mu P_x[t-1]+W_x[t-1],$$

where $P_x[t]$ is an x-axis panning value of the frame t, and a is a tuning coefficient (e.g., ~0.9). If $|P_x[t]|$ is greater than a threshold level (e.g., 5% of x-axis length), then the DSP 204 determines that the camera system 104 is being panned along the x-axis, because the camera system 104 is being moved along the x-axis beyond the threshold level during a time that includes one or more successive frames of the video sequence. Conversely, if $|P_x[t]|$ is less than or equal to the threshold level, then the DSP 204 determines that the camera system 104 is not being panned along the x-axis. Accordingly, in response to a relatively few frames of such panning along the x-axis, the DSP 204 detects such panning along the x-axis.

In response to determining that the camera system 104 is not being panned along the x-axis, the operation continues from the step 606 to a step 608. At the step 608, the DSP 204 computes the x-axis coordinate of the upper left corner of the window as $U_x[t]=KU_x[t-1]-W_x[t-1]$, where K is a tuning coefficient (e.g., ~0.9). In that manner, the DSP 204 counteracts most effects of the camera system 104 movement along the x-axis (as represented by the estimated motion vector) by shifting the window toward an edge of the image, such as: (a) toward a left edge of the image in response to a right movement of the camera system 104 along the x-axis (as shown in FIG. 3); or (b) conversely, toward a right edge of the image in response to a left movement of the camera system 104 along the x-axis.

Similarly, at a next step 610, the DSP 204 determines whether the camera system 104 is being panned along the y-axis. In the illustrative embodiments, the DSP 204 makes such determination by applying the following filter:

$$P_y[t]=\alpha P_y[t-1]+W_y[t-1]$$

where $P_y[t]$ is a y-axis panning value of the frame t, and a is the tuning coefficient. If $|P_y[t]|$ is greater than a threshold level (e.g., 5% of y-axis length), then the DSP 204 determines that the camera system 104 is being panned along the y-axis, because the camera system 104 is being moved along the y-axis beyond the threshold level during a time that includes one or more successive frames of the video sequence. Conversely, if $|P_y[t]|$ is less than or equal to the threshold level, then the DSP 204 determines that the camera system 104 is not being panned along the y-axis. Accordingly, in response to a relatively few frames of such panning along the y-axis, the DSP 204 detects such panning along the y-axis.

In response to determining that the camera system 104 is not being panned along the y-axis, the operation continues from the step 610 to a step 612. At the step 612, the DSP 204 computes the y-axis coordinate of the upper left corner of the window as $U_y[t]=KU_y[t-1]-W_y[t-1]$, where K is the tuning coefficient. In that manner, the DSP 204 counteracts most effects of the camera system 104 movement along the y-axis (as represented by the estimated motion vector) by shifting the window toward an edge of the image, such as: (a) toward a top edge of the image in response to a downward movement of the camera system 104 along the y-axis; or (b) conversely, toward a bottom edge of the image in response to an upward movement of the camera system 104 along the y-axis.

After the step 612, the operation continues to a next step 614, at which the DSP 204 outputs (to the encoding device 106) the portion of the image that is enclosed by the window. After the step 614, t=t+1, and the operation returns to the step 602.

Referring again to the step 606, in response to determining (at the step 606) that the camera system 104 is being panned along the x-axis, the operation continues from the step 606 to a step 616. At the step 616, the DSP 204 slightly moves the window along the x-axis toward the neutral position of $U_x[t]=0$ during the panning, so that the DSP 204 computes the x-axis coordinate of the upper left corner of the window as $U_x[t]=KU_x[t-1]$, where K is the tuning coefficient. In that manner, the DSP 204 preserves most effects of the panning, while concurrently shifting the video sequence's window gradually along the x-axis toward the neutral position of $U_x[t]=0$ that balances flexibility in counteracting effects of a subsequent physical movement of the camera system 104 along the x-axis (e.g., flexibility in counteracting effects of the subsequent physical movement whose direction along the x-axis might be reversed from a direction of $W_x[t-1]$). After the step 616, the operation continues to the step 610.

Referring again to the step 610, in response to determining (at the step 610) that the camera system 104 is being panned along the y-axis, the operation continues from the step 610 to a step 618. At the step 618, the DSP 204 slightly moves the window along the y-axis toward the neutral position of $U_y[t]=0$ during the panning, so that the DSP 204 computes the y-axis coordinate of the upper left corner of the window as $U_y[t]=KU_y[t-1]$, where K is the tuning coefficient. In that manner, the DSP 204 preserves most effects of the panning, while concurrently shifting the video sequence's window gradually along the y-axis toward the neutral position of $U_y[t]=0$ that balances flexibility in counteracting effects of a subsequent physical movement of the camera system 104 along the y-axis (e.g., flexibility in counteracting effects of the subsequent physical movement whose direction along the y-axis might be reversed from a direction of $W_y[t-1]$). After the step 618, the operation continues to the step 614.

Referring to the steps 616 and 618, the operator is less likely to perceive the slight movement from those steps during the panning, because: (a) the operator is already perceiving a shift of the image during the panning; and (b) a slight increase in speed of the shift is harder for the operator to perceive during the panning. In that manner, when the DSP 204 determines that the camera system 104 has ceased being panned, the window is already closer to being centered within the image, so that: (a) the DSP 204 is able to more quickly center the window within the image by fewer subsequent iterations of the steps 608 and 612 (e.g., by fewer subsequent frames); and (b) accordingly, the operator perceives less delay by the DSP 204 in returning the window to be centered within the image.

In the illustrative embodiments, the DSP 204 selects the portion (which is output to the encoding device 106) by automatically shifting the window to suitably crop the image, as shown in FIGS. 3, 4 and 5. In an alternative embodiment, the DSP 204 selects the portion (which is output to the encoding device 106) by suitably adjusting one or more lenses (e.g., with active optics techniques) and/or sensors of the camera system 104.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by an information handling system for reducing a delay from panning a camera system, the method comprising:
receiving a first estimate of a physical movement of the camera system along a first axis;
receiving a second estimate of the physical movement of the camera system along a second axis, wherein the second axis is perpendicular to the first axis;
in response to the first estimate, determining whether the camera system is being panned along the first axis;
in response to the second estimate, determining whether the camera system is being panned along the second axis;
in response to determining that the camera system is not being panned along the first axis, counteracting most effects of the physical movement along the first axis in a video sequence from the camera system, even if the camera system is being panned along the second axis;
in response to determining that the camera system is not being panned along the second axis, counteracting most effects of the physical movement along the second axis in the video sequence, even if the camera system is being panned along the first axis;
in response to determining that the camera system is being panned along the first axis, preserving most effects of the panning along the first axis in the video sequence, while concurrently shifting the video sequence along the first axis toward a position that balances flexibility in counteracting effects of a subsequent physical movement of the camera system along the first axis, even if the camera system is not being panned along the second axis; and
in response to determining that the camera system is being panned along the second axis, preserving most effects of the panning along the second axis in the video sequence, while concurrently shifting the video sequence along the second axis toward a position that balances flexibility in counteracting effects of a subsequent physical movement of the camera system along the second axis, even if the camera system is not being panned along the first axis.

2. The method of claim 1, wherein determining whether the camera system is being panned includes: determining whether the camera system is being moved beyond a threshold level during a time that includes one or more successive frames of the video sequence.

3. The method of claim 1, wherein receiving the estimate of the physical movement includes: receiving the estimate of the physical movement from at least one motion sensor.

4. The method of claim 1, wherein counteracting most effects of the physical movement includes: in response to determining that the camera system is not being panned, counteracting most effects of the physical movement by cropping at least one image of the video sequence.

5. The method of claim 1, wherein the camera system includes the information handling system.

6. The method of claim 1, and comprising:
displaying the video sequence.

7. An information handling system for reducing a delay from panning a camera system, the system comprising:
a combination of electronic circuitry components for:
receiving a first estimate of a physical movement of the camera system along a first axis; receiving a second estimate of the physical movement of the camera system along a second axis, wherein the second axis is perpendicular to the first axis; in response to the first estimate, determining whether the camera system is being panned along the first axis; in response to the second estimate, determining whether the camera system is being panned along the second axis; in response to determining that the camera system is not being panned along the first axis, counteracting most effects of the physical movement along the first axis in a video sequence from the camera system, even if the camera system is being panned along the second axis; in response to determining that the camera system is not being panned along the second axis, counteracting most effects of the physical movement along the second axis in the video sequence, even if the camera system is being panned along the first axis; in response to determining that the camera system is being panned along the first axis, preserving most effects of the panning along the first axis in the video sequence, while concurrently shifting the video sequence along the first axis toward a position that balances flexibility in counteracting effects of a subsequent physical movement of the camera system along the first axis, even if the camera system is not being panned along the second axis; and, in response to determining that the camera system is being panned along the second axis, preserving most effects of the panning along the second axis in the video sequence, while concurrently shifting the video sequence along the second axis toward a position that balances flexibility in counteracting effects of a subsequent physical movement of the camera system along the second axis, even if the camera system is not being panned along the first axis.

8. The information handling system of claim 7, wherein determining whether the camera system is being panned includes: determining whether the camera system is being moved beyond a threshold level during a time that includes one or more successive frames of the video sequence.

9. The information handling system of claim 7, wherein receiving the estimate of the physical movement includes: receiving the estimate of the physical movement from at least one motion sensor.

10. The information handling system of claim 7, wherein counteracting most effects of the physical movement includes: in response to determining that the camera system is not being panned, counteracting most effects of the physical movement by cropping at least one image of the video sequence.

11. The information handling system of claim 7, wherein the camera system includes the information handling system.

12. The information handling system of claim 7, wherein the combination of electronic circuitry components is for displaying the video sequence.

13. A computer program product for reducing a delay from panning a camera system, the computer program product comprising:
a non-transitory computer-readable storage medium; and
a computer-readable program stored on the computer-readable storage medium, wherein the computer-readable program is processable by an information handling system for causing the information handling system to perform operations including: receiving a first estimate of a physical movement of the camera system along a first axis; receiving a second estimate of the physical movement of the camera system along a second axis, wherein the second axis is perpendicular to the first axis; in response to the first estimate, determining whether the camera system is being panned along the first axis; in response to the second estimate, determining whether the camera system is being panned along the second axis; in response to determining that the camera system is not being panned along the first axis, counteracting most effects of the physical movement along the first axis in a video sequence from the camera system, even if the camera system is being panned along the second axis; in response to determining that the camera system is not being panned along the second axis, counteracting most effects of the physical movement along the second axis in the video sequence, even if the camera system is being panned along the first axis; in response to determining that the camera system is being panned along the first axis, preserving most effects of the panning along the first axis in the video sequence, while concurrently shifting the video sequence along the first axis toward a position that balances flexibility in counteracting effects of a subsequent physical movement of the camera system along the first axis, even if the camera system is not being panned along the second axis; and, in response to determining that the camera system is being panned along the second axis, preserving most effects of the panning along the second axis in the video sequence, while concurrently shifting the video sequence along the second axis toward a position that balances flexibility in counteracting effects of a subsequent physical movement of the camera system along the second axis, even if the camera system is not being panned along the first axis.

14. The computer program product of claim 13, wherein determining whether the camera system is being panned includes: determining whether the camera system is being moved beyond a threshold level during a time that includes one or more successive frames of the video sequence.

15. The computer program product of claim 13, wherein receiving the estimate of the physical movement includes: receiving the estimate of the physical movement from at least one motion sensor.

16. The computer program product of claim 13, wherein counteracting most effects of the physical movement includes: in response to determining that the camera system is not being panned, counteracting most effects of the physical movement by cropping at least one image of the video sequence.

17. The computer program product of claim 13, wherein the camera system includes the information handling system.

18. The computer program product of claim 13, wherein the operations include displaying the video sequence.

* * * * *